United States Patent
Tanaka

(10) Patent No.: US 7,348,794 B2
(45) Date of Patent: Mar. 25, 2008

(54) OUTPUT BUFFER CIRCUIT

(75) Inventor: Makoto Tanaka, Kanagawa (JP)

(73) Assignee: NEC Electronics Corporation, Kawasaki, Kanagawa (JP)

( * ) Notice: Subject to any disclaimer, the term of this patent is extended or adjusted under 35 U.S.C. 154(b) by 25 days.

(21) Appl. No.: 11/500,333

(22) Filed: Aug. 8, 2006

(65) Prior Publication Data
US 2007/0046332 A1    Mar. 1, 2007

(30) Foreign Application Priority Data
Aug. 23, 2005    (JP)    ............................. 2005-240774

(51) Int. Cl.
    *H03K 17/16*    (2006.01)
    *H03K 19/003*   (2006.01)
(52) U.S. Cl. ............................. 326/26; 326/27; 326/30
(58) Field of Classification Search ............ 326/26–27, 326/30, 87; 327/108, 112
    See application file for complete search history.

(56) References Cited

U.S. PATENT DOCUMENTS

| 6,674,313 | B2 | 1/2004 | Kurisu et al. |
| 6,772,250 | B2 * | 8/2004 | Dreps et al. ................. 710/100 |
| 6,897,685 | B2 | 5/2005 | Sato |
| 2006/0006901 | A1 * | 1/2006 | Groen et al. .................. 326/27 |

FOREIGN PATENT DOCUMENTS

| JP | 2002-94365 | 3/2002 |
| JP | 2004-88693 | 3/2004 |

* cited by examiner

*Primary Examiner*—Anh Q. Tran
(74) *Attorney, Agent, or Firm*—McGinn IP Law Group, PLLC

(57) ABSTRACT

Disclosed is an output buffer including a first output buffer for data for receiving a data signal and outputting an output signal from an output terminal, a second output buffer with an output end thereof connected to the output terminal, and a selection circuit. The selection circuit receives a control signal indicating whether de-emphasis enabled or de-emphasis is disabled and performs switching control so that when the control signal indicates that the de-emphasis is disabled, the second output buffer is deactivated, when the control signal indicates that the de-emphasis is enabled, emphasis data obtained on delaying the data signal through a delay circuit is supplied to an input end of the second output buffer, thereby causing the second output buffer to operate as a de-emphasis buffer, and when a test control signal is of a value indicating an amplitude margin test, the data signal is selected to be supplied to the input end of the second output buffer.

7 Claims, 6 Drawing Sheets

WHEN DE-EMPHASIS IS NOT SET

OUTPUT BUFFER CIRCUIT

FIELD OF THE INVENTION

The present invention relates to a semiconductor circuit, and more particularly to an output buffer circuit with the de-emphasis function.

BACKGROUND OF THE INVENTION

Patent Documents 1 and 2 disclose an output buffer equipped with de-emphasis function in which the amplitude of an output signal emphasized when the logic of the output signal is changed, is attenuated when the logic of the output signal following the change remains unchanged. Patent document 1 discloses a configuration including a main buffer, a delay circuit, an emphasis driver, and a subtracter composed of a differential circuit. Patent Document 2 discloses an emphasis circuit constituted by a CMOS inverter, with a configuration including a tri-state buffer that performs switching control to determine whether to activate the emphasis function based on the control signal.

FIG. 5 is a diagram showing the configuration of an output buffer circuit equipped with a conventional de-emphasis function. For the sake of description, the following describes an exemplary configuration in which the ENABLE signal is introduced into the configuration (differential circuit), described in Patent Document 1, as the control signal for activating the emphasis function. Patent Documents 1 and 2 disclose an output buffer having the pre-emphasis function, which emphasizes the amplitude at the transition bit when the logic of the signal is changed, and the de-emphasis function which decreases the emphasized amplitude when the logic of the bits following the transition bit is not changed. The following describes an output buffer with the de-emphasis function that outputs the amplitude defined by the power supply potential VDD in the transition bit and decreases the amplitude when the logic of the bit following the transition bit is not changed.

Referring to FIG. 5, the output buffer circuit comprises differential input terminals (INP/INN) that differentially receive a data signal; a main-data pre-buffer 53 that receives the differential signal input at the differential input terminals (INP/INN); a main-data main buffer 51 that receives a differential output (main-data) 57 from the main-data pre-buffer 53; a delay circuit 55 that receives the differential signal input at the differential input terminals (INP/INN), delays the signal, and differentially outputs the delayed signal; a de-emphasis pre-buffer 54 that differentially receives a differential output 56 from the delay circuit 55; and a de-emphasis main buffer 52 that differentially receives a differential output (de-emphasis data) 58 from the de-emphasis pre-buffer 54. The non-inverting output (positive) from the main-data main buffer 51 and the inverting output (negative; indicated by a circle) from the de-emphasis main buffer 52 are connected in common to a non-inverting output terminal OUTP. The inverting output (negative; indicated by a circle) from the main-data main buffer 51 and the non-inverting output (positive) from the de-emphasis main buffer 52 are connected in common to an inverting output terminal OUTN. The de-emphasis pre-buffer 54 and the de-emphasis main buffer 52 become active and operable when they receive the control signal ENABLE that is active, and becomes inactive when the control signal ENABLE is inactive.

The main-data main buffer 51 and the de-emphasis main buffer 52 emphasize the amplitude of a signal for output when the signal to be output (OUTP/OUTN) undergoes the change of the logic.

When de-emphasis is disabled, the control signal ENABLE deactivates the de-emphasis main buffer 52 and the de-emphasis pre-buffer 54. In this case, the main-data main buffer 51 drives a transmission line alone (balanced transmission line connected to OUTP and OUTN). For this reason, the main data main buffer 51 is adapted to have a driving capability for driving the transmission line.

The amplitude of the transition bit, which is the first bit signal immediately after the logic of the signal output from the output terminals (a pair of differential output terminals) (OUTP/OUTN) is changed, is fixed regardless of whether de-emphasis is enabled or disabled.

The waveform is emphasized by attenuating the amplitude of non-transition bits that are the signals following the transition bit. For example, when the output signal level VOH of the transition bit, generated immediately after the signal level is changed from low to high, is the power supply potential VDD and the following bit (non-transition bit) is high, the amplitude VOH of this signal is set lower than VDD. When the output signal level VOL of the transition bit, generated immediately after the signal level is changed from high to low, is the GND level and the following bit (non-transition bit) is low, the amplitude VOL of this signal is raised higher than GND.

FIG. 6 is a diagram showing an example of the configuration of the main buffer 50 composed by the main-data main buffer 51 and the de-emphasis main buffer 52 shown in FIG. 5. In FIG. 6, the buffer 51 in FIG. 5 corresponds to a circuit 20 and the buffer 52 in FIG. 5 corresponds to circuit 21.

Referring to FIG. 6, the configuration comprises N-channel MOS transistors 22 and 23 which have sources connected in common to a constant current source I1 (current value is variably controlled) and which have gates for receiving the non-inverting signal (Main data positive) and the inverting signal (Main data negative) of the main data 57 in FIG. 5 respectively; and N-channel MOS transistors 24 and 25 which have sources connected in common to a constant current source I2 (current value is variably controlled) and which have gates for receiving the non-inverting signal (Emphasis data positive) and the inverting signal (Emphasis data negative) of the emphasis data 58 in FIG. 5 respectively. The drain of the transistor 22 and the drain of the transistor 25 are connected in common to the inverting terminal OUTN and, via a resistor R1, connected to the power supply VDD, and the drain of the transistor 23 and the drain of the transistor 24 are connected in common to the non-inverting terminal OUTP and, via a resistor R2, connected to the power supply VDD. The constant current source I2 and a switch SW are connected in series between the coupled source of the N-channel MOS transistors 24 and 25 and the ground and, when emphasis is disabled, the control signal ENABLE is inactive and the switch SW is off. The following describes the operation when emphasis is enabled (control signal ENABLE is active and switch SW is on). In the description below, a high level is a logic value 1, and a low level is a logic value 0.

When the non-inverting signal and the inverting signal of the main data 57 are 1 and 0 and the non-inverting signal and the inverting signal of the emphasis data 58 are 0 and 1 (non-inverting signal of main data 57 is the transition bit that changes from 0 to 1), the transistors 22 and 25 whose drains are connected in common are turned on, the transistors 23 and 24 are turned off, and the current corresponding to the sum of the currents of the current sources I1 and I2 flows through the resistor R1. OUTN=VDD−(I1+I2)×R1 and OUTP=VDD and the amplitude of the output signal is OUTP−OUTN=(I1+I2)×R1.

When the non-inverting signal and the inverting signal of the main data 57 are 1 and 0 and the non-inverting signal and the inverting signal of the emphasis data 58 are 1 and 0, the transistors 22 and 24 are turned on, the transistors 23 and 25 are turned off, and the currents corresponding to I1 and I2 flow through the resistors R1 and R2, respectively. Because the voltage difference between OUTP and OUTN is calculated from OUTN=VDD−R1×I1 and OUTP=VDD−R2×I2, the amplitude of the output signal is OUTP−OUTN=R1×I1−R2×I2. When R1=R2=R, OUTP−OUTN=R×(I1−I2) and the circuit in FIG. 6 becomes a subtraction circuit. The amplitude of OUTP−OUTN becomes smaller than that of the transition bit ((I1+I2)×R1), indicating that de-emphasis is performed.

When the non-inverting signal and the inverting signal of the main data 57 are 0 and 1 and the non-inverting signal and the inverting signal of the emphasis data 58 are 1 and 0 (non-inverting signal of main data 57 is the transition bit that changes from 1 to 0), the transistors 23 and 24 are turned on, the transistors 22 and 25 are turned off, and the current corresponding to the sum of the currents of I1 and I2 flows through the resistor R2. OUTP=VDD−(I1+I2)×R2 and OUTN=VDD and the amplitude of the output signal is OUTP−OUTN=−(I1+I2)×R2.

When the non-inverting signal and the inverting signal of the main data 57 are 0 and 1 and the non-inverting signal and the inverting signal of the emphasis data 58 are 0 and 1, the transistors 23 and 25 are turned on, the transistors 22 and 24 are turned off, and the currents corresponding to I2 and I1 flow through the resistors R1 and R2, respectively. Because the voltage difference between OUTP and OUTN is calculated from OUTN=VDD−R1×I2 and OUTP=VDD−R2×I1, the amplitude of the output signal is OUTP−OUTN=R1×I2−R2×I1. When R1=R2=R, OUTP−OUTN=R×(I2−I1) and the circuit in FIG. 6 becomes a subtraction circuit. The amplitude of OUTP−OUTN becomes smaller than that of the transition bit, indicating that de-emphasis is performed.

When emphasis is disabled, the differential circuit 21 is inactive and only the differential circuit 20 is active.

When the de-emphasis is enabled, the currents that flow through the constant current sources I1 and I2, respectively have current values having a relationship of a ratio determined by a de-emphasis level. When the de-emphasis is disabled, a current for driving the transmission line flows through the current source I1 alone, and no current flows through the constant current source I2.

Then, when a circuit configuration is made in which the amplitude of the transition bit becomes the same in both cases where the de-emphasis is enabled and where the de-emphasis is disabled, the sum of the currents from the constant current source I1 and the constant current source I2 when the de-emphasis is enabled is controlled to be equal to the value of the current from the constant current source I1 when the de-emphasis is disabled. When the de-emphasis is disabled (the circuit 21 is inactive), for example, the current value of the constant current source I1 of the circuit 20 is adjustably controlled to become equal to a sum value I of the currents of the constant current source I1 and the constant current source I2 at the time of the de-emphasis being enabled.

[Patent Document 1]
 JP Patent Kokai Publication No. JP-P-2004-88693A

[Patent Document 2]
 JP Patent Kokai Publication No. JP-P-2002-94365A

SUMMARY OF THE DISCLOSURE

When a signal of a small amplitude is output from the output buffer circuit using a common circuit configuration, it becomes possible by controlling over the current of the current source constituting the main buffer 50, for example. That is, the current from the constant current source I1 in FIG. 6 should be reduced. However, this will raises a common mode level.

In order to maintain the common mode level, a circuit for controlling the common mode level needs to be added to the main buffer 50 separately, thereby generating a problem that a layout area in this state increases.

When a function comparable to that for an amplitude margin test is added to the existing output buffer afterwards, a circuit is added to a portion directly connected to an external pin. Thus, evaluation as to reliability against events such as ESD (electrostatic Discharge: electrostatic discharge) or latch up (latch Up) becomes further necessary, which leads to a longer design period and an increase in development cost.

Further, in the configuration of the circuit described with reference to FIG. 5, only two types of states such as:

(a) outputting the signal having an amplitude not emphasized at the transition bit when the de-emphasis is disabled; and (b) outputting the signal having an amplitude emphasized at the transition bit when the de-emphasis is enabled, can be realized.

For this reason, in order to output a signal of a small amplitude with no de-emphasis characteristic, the only thing to do is to control the current for driving the main data main buffer to be reduced. However, together with this operation, the common mode level will increase.

The present invention disclosed in this application is generally configured as follows:

A circuit according to one aspect of the present invention is an output buffer circuit for receiving a data signal to be output and having a de-emphasis function which emphasizes an amplitude of an output signal, for output, at a time of transition when a logic of the data signal changes, and attenuates the amplitude of the output signal, for output, at a time of non-transition subsequent to the transition when the data signal has a value of a same logic as the logic after the transition.

The output buffer circuit includes: a circuit for performing control so that when an input control signal is of a value indicating an amplitude margin test mode, the amplitude of the output signal at a time of the transition is set to be the same as the amplitude at the time of the non-transition, and the signal of the amplitude smaller than an amplitude at a time of a normal operation is thereby output.

In the present invention, the output buffer circuit includes:
 a first output buffer for receiving the data signal, for output;
 a second output buffer having an output connected in common with an output of said first output buffer;
 a delay circuit for receiving the data signal and delaying the data signal by a predetermined time, for output; and
 a selection circuit for performing switching control so that when de-emphasis is enabled, a signal obtained on delaying the data signal by the delay circuit is supplied to an input end of said second output buffer; and during the amplitude margin test mode, the data signal is supplied to said input end of said second output buffer;

said first output buffer and said second output buffer being configured to output a signal obtained on subtracting the output of said second buffer from the output of said first buffer, as the output signal.

The present invention may be so configured that when de-emphasis is disabled, said second buffer is set in an off state, the amplitude of the output signal is emphasized, for output, at the time of the transition when the logic of the data signal changes, and also at the time of the non-transition when the data signal has the same logic value as that immediately after the transition, the output signal of the same amplitude as the amplitude at the time of the transition is output.

An output buffer circuit according to another aspect of the present invention includes:

a first output buffer for data, receiving a data signal and outputting an output signal from an output terminal;

a second output buffer having an output end connected to said output terminal;

a delay circuit for receiving the data signal and delaying the data signal by a predetermined time, for output; and a selection circuit for receiving a control signal indicating whether de-emphasis is enabled or disabled and performing switching control so that when the control signal indicates that the de-emphasis is disabled, said second output buffer is deactivated, when the control signal indicates that the de-emphasis is enabled, emphasis data obtained on delaying the data signal by said delay circuit is supplied to an input end of said second output buffer to cause said second output buffer to operate as a de-emphasis buffer, and when a test control signal received is of a value indicating an amplitude margin test mode, the data signal is selected to be supplied to the input end of said second output buffer.

The present invention may be so configured that the data signal is constituted from differential signals;

said first output buffer includes: a first pre-buffer constituted from a differential circuit; and a first main buffer constituted from a differential circuit for receiving a differential output of said first pre-buffer;

said second output buffer includes a second main buffer constituted from a differential circuit;

non-inverting and inverting outputs of the differential output pair of said first main buffer are connected in common with inverting and non-inverting outputs of an differential output pair of said second main buffer, respectively, and respective common connection nodes are connected to non-inverting and inverting terminals of a differential output terminal pair, respectively; and said selection circuit receives the differential signal of the data signal and differential signal obtained on delaying the data signal by said delay circuit; and selects and differentially supplies the signal obtained on delaying the data signal by said delay circuit to the input end of said second main buffer when the control signal indicates that the de-emphasis is enabled, while said selection circuit selects and differentially supplies the data signal to said input end of said second output buffer when the test control signal is of a value indicating the amplitude margin test mode.

The meritorious effects of the present invention are summarized as follows.

According to the present invention, in the output buffer having the de-emphasis (or pre-emphasis) function, an amplitude of a transition bit, which is the first-bit signal immediately after the logic of the output signal has changed, is set to be the same as an amplitude of a non-transition bit, which is the signal subsequent to the transition bit so that a signal of a smaller amplitude than the amplitude at a time of a normal operation can be output.

Further, according to the present invention, by outputting the signal of the smaller amplitude that does not emphasize a logic change point of the signal, an amplitude margin check test function of a received signal at an input buffer connected through a transmission line can be easily added.

According to the present invention, a common mode level of the output signal in a test mode is not different from that in a normal operation mode. A receiving side thus can check an amplitude margin of a received signal.

Further, according to the present invention, using a simple configuration, an amplitude margin test mode can be provided without influencing the normal operation mode and without modifying a main buffer circuit.

Still other features and advantages of the present invention will become readily apparent to those skilled in this art from the following detailed description in conjunction with the accompanying drawings wherein only the preferred embodiments of the invention are shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

PREFERRED EMBODIMENTS OF THE INVENTION

Figure 1:
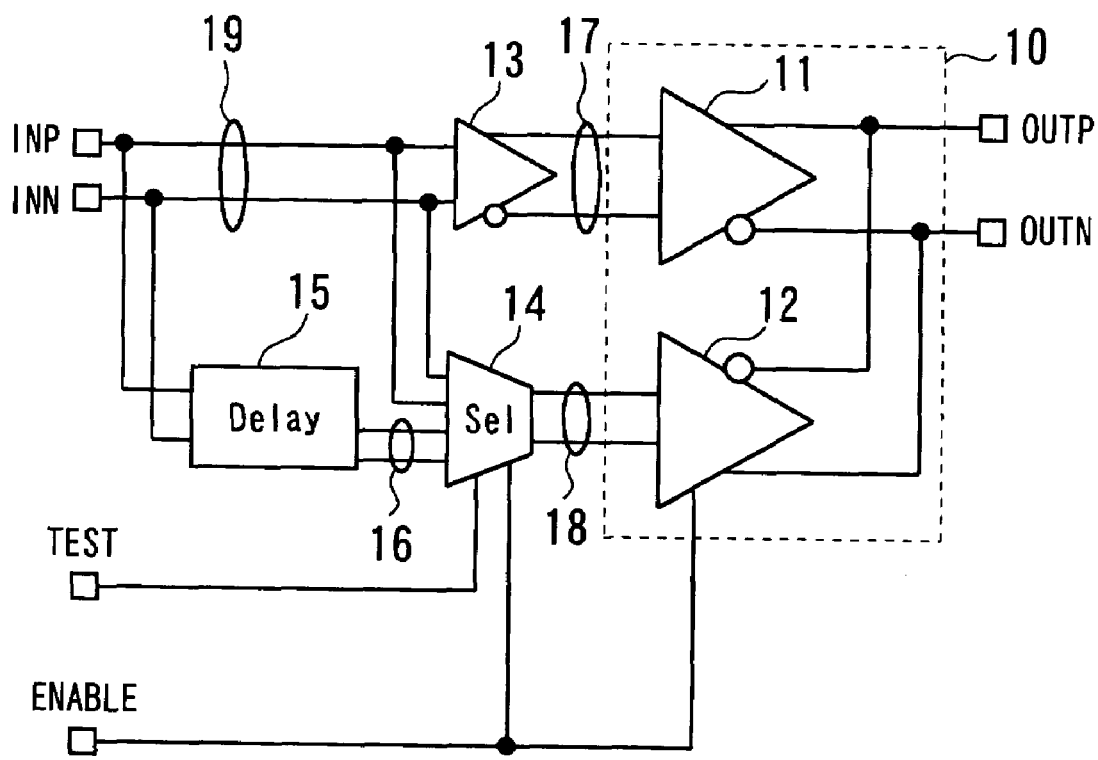
FIG. 1 is a diagram showing a configuration of an embodiment of the present invention.

In order to describe the present invention described above in further detail, a description will be given with reference to appended drawings. Referring to FIG. 1, the present invention includes a first output buffer (11) for data, a second output buffer (12), and a selection circuit (14). The first output buffer (11) receives a data signal and outputs an output signal from a pair of differential output terminals (OUTP/OUTN). Output terminals of the second output buffer (12) are connected to a pair of the differential output terminals (OUTP/OUTN). The selection circuit (14) receives a control signal ENABLE indicating whether de-emphasis is enabled or disabled. The selection circuit performs switching control so that when the control signal ENABLE indicates that the de-emphasis is enabled, emphasis data (16) obtained on delaying data signal (19) is supplied to input terminals of the second output buffer (12), thereby causing the second output buffer (12) to serve as the buffer for de-emphasis, and when a test control signal TEST indicates an amplitude margin test mode, the data signal (19)

are selected to be supplied to the input terminals of the second output buffer (12). At a time of the amplitude margin test, output of the signal of a smaller amplitude than an amplitude at a time of a normal operation is thereby enabled. When the control signal ENABLE indicates that the de-emphasis is disabled, the second output buffer (12) is made inactive, and the first output buffer (11) drives a transmission line connected to the output terminals. The following describes the embodiments more in detail.

FIG. 1 is a diagram showing the configuration according to the embodiment of the present invention. As shown in FIG. 1, an output buffer circuit according to the present embodiment includes a pair of differential input terminals (INP/INN) for differentially receiving a data signal, a main data pre-buffer 13 constituted from a differential circuit for differentially receiving the data signal 19 input from the differential input terminals (INP/INN), a main data main buffer 11 constituted from a differential circuit for differentially receiving a differential output (main data) 17 of the main data pre-buffer 13, a delay circuit 15 for differentially receiving the data signal 19 input from the differential input terminals (INP/INN) and delaying the input data signal by a predetermined delay time, for output differentially, a selection circuit 14 for receiving a differential output 16 of the delay circuit 15 and the differential data signal 19, selecting the differential data signal 19 at a time of an amplitude margin test mode and selecting the differential output 16 of the delay circuit 15, for output otherwise (at a time of the de-emphasis setting), based on the test control signal TEST, and a de-emphasis main buffer 12 constituted from a differential circuit for differentially receiving a differential output 18 from the selection circuit 14.

A non-inverting output of the differential output of the main data main buffer 11 and an inverting output of the differential output of the de-emphasis main buffer 12 are connected in common to the non-inverting terminal OUTP of a pair of the differential output terminals. An inverting output of the differential output of the main data main buffer 11 and a non-inverting output of the differential output of the de-emphasis main buffer 12 are connected in common to the inverting terminal OUTN of the pair of the differential output terminals. This configuration constitutes a subtraction circuit for subtracting the output of the de-emphasis main buffer 12 from the output of the main data main buffer 11.

The main data main buffer 11 and the de-emphasis main buffer 12 enlarge an amplitude of the signal to be output (from the differential terminal output pair OUTP/OUTN) when a logic of the signal is changed, to output the emphasized signal.

Figure 5:
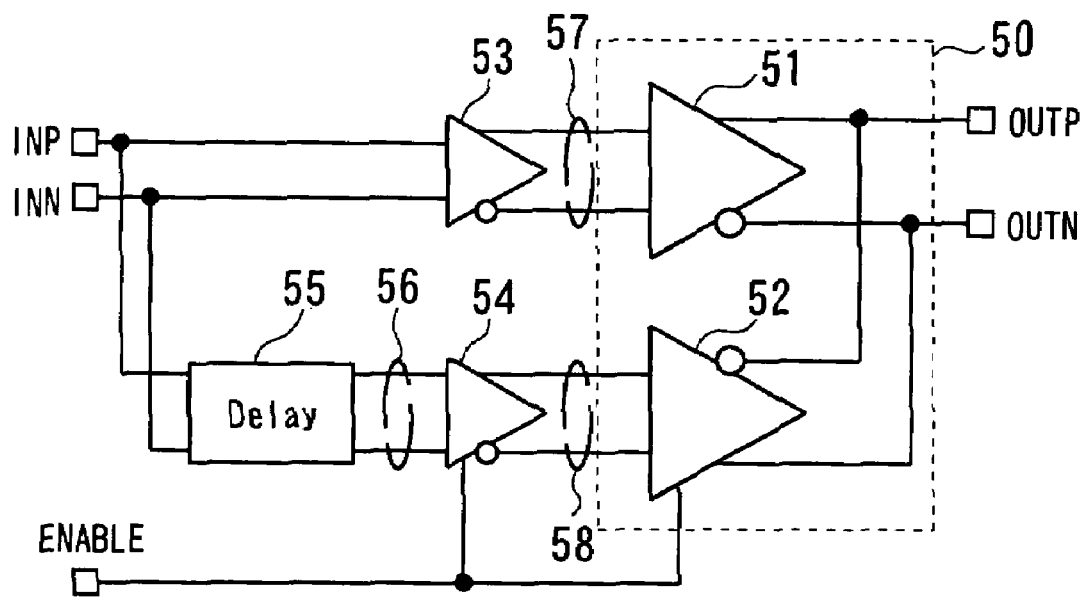
FIG. 5 is a diagram explaining a conventional circuit.

When de-emphasis is enabled, the control signal ENABLE is activated, and an amplitude of a non-transition bit, which is a signal subsequent to a transition bit, is attenuated, thereby performing waveform emphasis. When the de-emphasis is enabled, the data signal 16 delayed by the delay circuit 15 is selected by the selection circuit 14, and is supplied to the de-emphasis main buffer 12 as de-emphasis data 18. Subtraction of a signal obtained on differentially amplifying the de-emphasis data 18 (a signal of one bit before) by the de-emphasis main buffer 12 from the differential output of the main data main buffer 11 is performed. Based on the same principle as for conventional circuits described with reference to FIGS. 5 and 6, an amplitude of the transition bit is emphasized. With regard to the non-transition bit that follows the transition bit and has the same logic value as that of the transition bit, the amplitude of the output signal (VOH2−VOL2) is attenuated from the amplitude of the transition bit (VOH1−VOL1).

That is, when the de-emphasis is enabled, a circuit 10 performs the subtraction between the signal 17 obtained from the data signal 19 that have been input to the differential input terminals (INP/INN) and output through the main data pre-buffer 13 and the data signal 16 (de-emphasis data) obtained on delaying the data signal 19 input to the differential input terminals (INP/INN) through the delay circuit 15, to output the signal with the amplitude thereof emphasized when the logic of the signal is changed.

When the de-emphasis is disabled, the de-emphasis main buffer 12 is disabled (deactivated) based on the control signal ENABLE, and the main data main buffer 11 alone drives the transmission line connected to the differential output terminal pair (OUTP/OUTN).

In the present embodiment, the amplitude of the transition bit (VOH1−VOL1), which is the first-bit signal immediately after the logic of the signal to be output (from the terminal pair OUTP/OUTN) from the main buffer circuit 10, is the same both when the de-emphasis is enabled and when the de-emphasis is disabled. When the de-emphasis is disabled, a current-driving capability of the main data main buffer 11 is controlled to be larger than that when the de-emphasis is enabled.

When the amplitude margin test is set (when the control signal TEST is activated), the selection circuit 14 selects the data signal 19 according to the test control signal TEST, to supply the signal selected to the de-emphasis main buffer 12. To the main data main buffer 11, the signal obtained on differentially amplifying the data signal 19 through the main data pre-buffer 13 is supplied. The circuit 10 performs the subtraction between the signal 17 input from the main data pre-buffer 13 and the signal 18 that has the same logic as the signal 17 and input from the selector 14, and outputs the signal of an amplitude determined by a difference between currents (I1−I2, where I1>I2; I1 and I2 are currents supplied from current sources I1 and I2 in FIG. 6, respectively) driven by the main buffer 11 and the main buffer 12, respectively. Its amplitude is equal to the amplitude of the non-transition bit when the de-emphasis is enabled.

Figure 6:
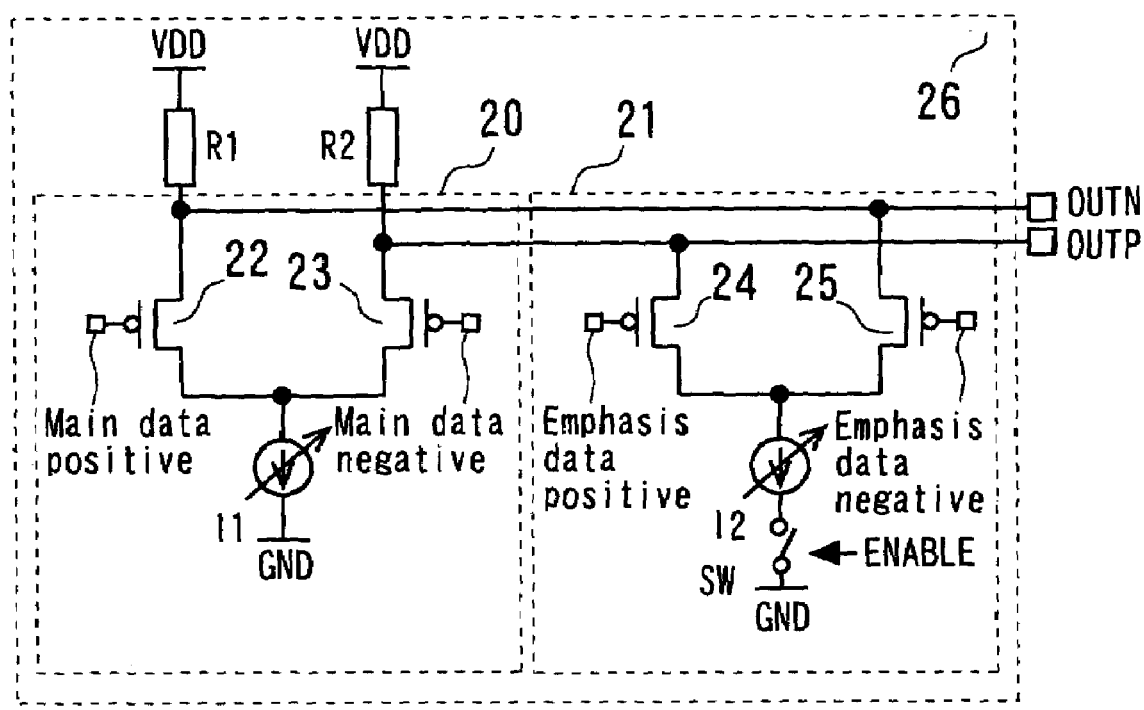
FIG. 6 is a diagram showing a configuration of a main buffer 10 in FIG. 1 or a main buffer 50 in FIG. 5.

When the main buffer circuit 10 is constituted from a differential output buffer, a circuit configuration shown in FIG. 6 can be employed. As an example of configurations of the main data main buffer 11 and de-emphasis main buffer 12, a circuit 26 constituted from circuits 20 and 21 is provided. Referring to FIGS. 1 and 6, the configuration of the main buffer circuit 10 will be described.

Referring to FIG. 6, in the present embodiment, the main buffer circuit 10 includes N-channel MOS transistors 22 and 23 which have sources connected in common to the constant current source I1 (with a current value thereof adjustably controlled), and which have gates for receiving a non-inverting (Main data positive) signal and an inverting (Main data negative) signal of the main data 17 in FIG. 1, respectively, and N-channel MOS transistors 24 and 25 which have sources connected in common to the constant current source I2 (with a current value adjustably controlled), and which have gates for receiving a non-inverting (Emphasis data positive) signal and an inverting (Emphasis data negative) signal of the de-emphasis data 18 in FIG. 1, respectively. A drain of the transistor 22 and a drain of the transistor 25 are connected in common to the inverting output terminal OUTN and are also connected to a power supply VDD through a resistor R1. A drain of the transistor 23 and a drain of the transistor 24 are connected in common to the non-inverting output terminal OUTP, and are also connected to the power supply VDD through a resistor R2. Between the coupled sources of the N-channel MOS transistors 24 and 25 and a ground, the constant current source I2 and a switch SW are connected in series. When emphasis is not set, the control signal ENABLE is inactive, and the switch SW is off.

Referring to FIG. 6, when the de-emphasis is enabled in the present embodiment, the currents that flow through the constant current sources I1 and I2, respectively have current values having a relationship of a ratio determined by a de-emphasis level.

When the de-emphasis is not enabled, the current for driving the transmission line flows through the constant current source I1 alone, and no current flows through the constant current source I2.

Adjustable control is performed so that a sum of the current values of the constant current source I1 and the constant current source I2 when the de-emphasis is enabled becomes equal to the current value of the constant current source I1 when the de-emphasis is not enabled. The control is performed so that the amplitude of the transition bit becomes the same both when the de-emphasis is enabled and when the de-emphasis is disabled.

Next, the ratio of the currents that are set to flow through the main buffers 11 and 12, respectively when the de-emphasis is enabled will be calculated specifically.

Assume that a current value (drive capability) necessary for the driving the transmission line when the de-emphasis is disabled, a constant current of the constant current source I1, a constant current of the constant current source I2, and a necessary emphasis level are indicated by A, B, C, and D[dB], respectively. Then, the following relations hold:

$$A = B \quad (1)$$

$$D = 20 * \log\left[(B-C)/(B+C)\right] (B>C) \quad (2)$$

Figure 2:
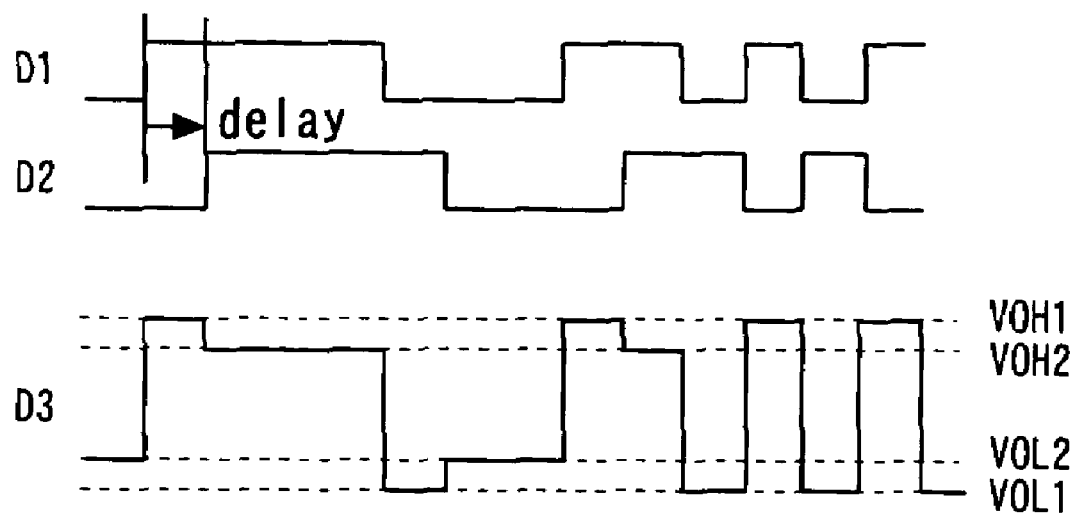
FIG. 2 is a diagram showing an operation when de-emphasis is enabled, according to the present invention.
Figure 3:
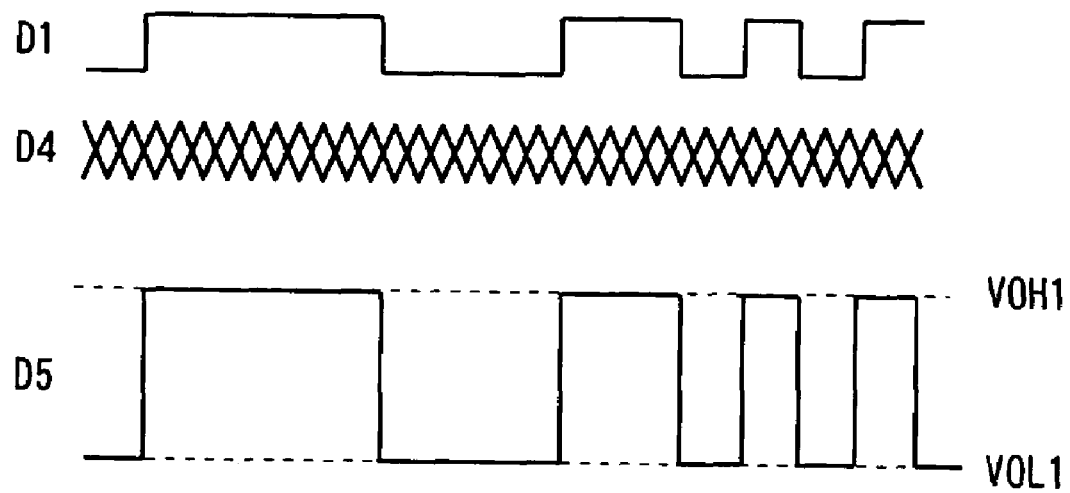
FIG. 3 is a diagram showing an operation when the de-emphasis is disabled, according to the present invention.
Figure 4:
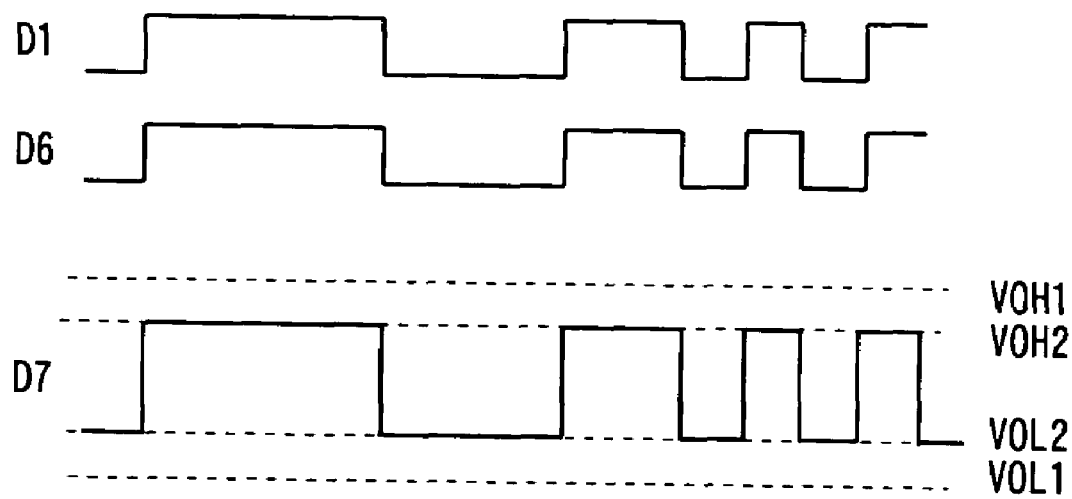
FIG. 4 is a diagram showing an operation when an amplitude margin test is set.

FIGS. 2 through 4 show relationships between logics and amplitudes of the signals input to the main buffer 11 and the main buffer 12 and the signals output from these buffers when the de-emphasis is enabled, when the de-emphasis is disabled, and when the amplitude margin test is set (with only the non-inverting signals shown, for simplicity).

Referring to FIG. 2, when the de-emphasis is enabled, a signal D1 is the signal supplied to the main buffer 11, and a signal D2 is the signal obtained on adding only a delay to the signal D1 by the delay circuit 15 and supplied to the main buffer 12. At the circuit 10, subtraction of the signal D2 from the signal D1 is performed, so that the output signal with the amplitude thereof emphasized at a time of a change in the logic of the signal is obtained. A high-level output voltage when the output signal transitions from a low level to a high level is indicated by VOH1, a high-level output voltage of the non-transition bit is indicated by VOH2 (in which VOH2<VOH1), a low level output voltage when the output signal transitions from the high level to the low level is indicated by VOL1, and a low-level output voltage of the non-transition bit is indicated by VOL2 (in which VOL2>VOL1).

Referring to FIG. 3, when the de-emphasis is disabled, the signal D1 is the signal supplied to the main buffer 11, and a signal D4 is a logic signal that causes an output of the main buffer 12 to be in a high-impedance state. A logic of a signal D5 output from the main buffer circuit 10 is determined only by a logic of the signal D1 supplied to the main buffer 11. The high-level output voltage is always VOH1 irrespective of whether the transition is made or not. The low-level output voltage is always VOL1 irrespective of whether the transition is made or not.

Referring to FIG. 4, when the amplitude margin test is set, the signal D1 is the signal received by the main buffer 11. A signal D6 is the signal having the same timing as the signal D1 and having the same logic as the signal D1. The signal D6 is received by the main buffer 12. Since the subtraction is performed at the circuit 10, the signal of the amplitude determined by the difference in the currents driven by the respective main buffers is output, and becomes the signal with no waveform emphasis performed when the logic of the signal is changed, as shown in a signal D7. When the de-emphasis is enabled and when the amplitude margin test is set, the amplitude of the non-transition bit is equal. The amplitude of the transition bit differs. The high-level output voltage is always VOH2 irrespective of whether the transition is made or not. The low-level output voltage is always VOL2 irrespective of whether the transition is made or not.

As described above, according to the present embodiment, at the output buffer having a de-emphasis function, when the amplitude margin test is set, the amplitude of the transition bit becomes the same as the amplitude of the non-transition bit, which is the signal subsequent to the transition bit, based on the control signal. The signal of the amplitude smaller than the amplitude at the time of the normal operation is thereby able to be output.

According to the present embodiment, without changing the main buffer, addition of an amplitude margin check test function for a received signal at an input buffer can be easily performed.

The circuit 10 for performing the subtractions, provided for implementing the de-emphasis function is effectively utilized, and at the de-emphasis main buffer, a scheme capable of inputting to the de-emphasis main buffer the signal of the same logic as the signal input to the main data main buffer at the same timing as that for the main data main buffer is provided. The signal having the same amplitude as the amplitude of the non-transition bit when the de-emphasis is enabled and with no waveform emphasis performed can be thereby sent out.

Further, according to the present embodiment, a differential amplitude can be reduced for output, without increasing a common mode level of the output signal. For this reason, the accuracy in the measurement at a time of the amplitude margin test at a test step can be improved.

The output buffer circuit in the present embodiment equipped with an amplitude margin test function is made suitable for being incorporated into a semiconductor device, and the output buffer circuit thereby contributes to the improvement of testability and test accuracy. At a test step of a Ser/Des serial interface including the output buffer circuit according to the present embodiment in a serialization circuit thereof, the signal (signal of the smaller amplitude) output from the output buffer circuit may be loop backed to the input buffer of a channel thereof, and the amplitude margin test on the input buffer may be performed in accordance with a loop back scheme. Alternatively, the signal (signal of the smaller amplitude) output from the output buffer circuit may be loop-backed to the input buffer of other channel, and the amplitude margin test on the input buffer of the other channel may be performed. Alternatively, in order to check whether the amplitude margin test function operates properly or not, the signal of the smaller amplitude may be received by an LSI tester to check whether a level of the signal is a desired level or not.

The present embodiment is made suitable for use in the output buffer or the like in the serialization circuit of the serialization/deserialization (Ser/Des) interface (for outputting transmission serial data to a transmission line). The above description was given in connection with the embodiment. The present invention is not, however, limited to the configuration of the embodiment described above alone, and may of course include various variations and modifications that could be made by those skilled in the art within the scope of claims of the present invention.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. An output buffer circuit receiving a data signal to be output and having a de-emphasis function in which an amplitude of an output signal is emphasized at a time of transition when a logic value of the data signal changes and the emphasized amplitude of the output signal is attenuated at a time of non-transition subsequent to the transition when the data signal has a logic value same as that immediately after the transition, said output buffer circuit comprising:

a circuit receiving a control signal for performing control, when the control signal is of a value indicating an amplitude margin test mode, so as to set the amplitude of the output signal at the time of the transition to be the same as the amplitude at the time of the non-transition and to output the output signal of the amplitude smaller than an amplitude at a time of a normal operation.

2. The output buffer circuit according to claim 1, comprising:

a first output buffer for receiving the data signal, for output;

a second output buffer having an output connected in common with an output of said first output buffer;

a delay circuit for receiving the data signal and delaying the data signal by a predetermined time, for output; and a selection circuit for performing switching control so that when de-emphasis is enabled, a signal obtained on delaying the data signal by said delay circuit is supplied to an input end of said second output buffer; and during the amplitude margin test mode, the data signal is supplied to said input end of said second output buffer;

said first output buffer and said second output buffer being configured to output a signal obtained on subtracting the output of said second buffer from the output of said first buffer, as the output signal.

3. The output buffer according to claim 2, wherein when de-emphasis is disabled, said second buffer is set in an off state, the amplitude of the output signal is emphasized, for output, at the time of the transition when the logic of the data signal changes, and also at the time of the non-transition when the data signal has the same logic value as that immediately after the transition, the output signal of the same amplitude as the amplitude at the time of the transition is output.

4. An output buffer circuit comprising:

a first output buffer for data, receiving a data signal and outputting an output signal from an output terminal;

a second output buffer having an output end connected to said output terminal;

a delay circuit for receiving the data signal and delaying the data signal by a predetermined time, for output; and a selection circuit for receiving a control signal indicating whether de-emphasis is enabled or disabled and performing switching control so that when the control signal indicates that the de-emphasis is disabled, said second output buffer is deactivated, when the control signal indicates that the de-emphasis is enabled, emphasis data obtained on delaying the data signal by said delay circuit is supplied to an input end of said second output buffer to cause said second output buffer to operate as a de-emphasis buffer, and when a test control signal received is of a value indicating an amplitude margin test mode, the data signal is selected to be supplied to the input end of said second output buffer.

5. The output buffer circuit according to claim 4, wherein the data signal comprises differential signals;

said first output buffer includes: a first pre-buffer constituted from a differential circuit; and a first main buffer constituted from a differential circuit for receiving a differential output of said first pre-buffer;

said second output buffer includes a second main buffer constituted from a differential circuit;

non-inverting and inverting outputs of the differential output pair of said first main buffer are connected in common with inverting and non-inverting outputs of an differential output pair of said second main buffer, respectively, with common connection nodes thereof being connected to non-inverting and inverting terminals of a differential output terminal pair, respectively; and wherein said selection circuit receives the differential signal of the data signal and differential signal obtained on delaying the data signal by said delay circuit; and selects and differentially supplies the signal obtained on delaying the data signal by said delay circuit to the input end of said second main buffer when the control signal indicates that the de-emphasis is enabled, while said selection circuit selects and differentially supplies the data signal to said input end of said second output buffer when the test control signal is of a value indicating the amplitude margin test mode.

6. A semiconductor device including said output buffer circuit as set fourth in claim 1.

7. An interface circuit comprising a transmission system and a reception system; said transmission system including said output buffer circuit as set fourth in claim 1;

said interface circuit having an amplitude margin test function of said reception system that receives a signal output from said output buffer circuit.

* * * * *